L. H. PARKER.
SYSTEM AND APPARATUS FOR SPRAYING IN COOLING PONDS AND THE LIKE.
APPLICATION FILED FEB. 5, 1916.

1,233,119.

Patented July 10, 1917.
5 SHEETS—SHEET 3.

Inventor:
Lee H. Parker,
by [signature]
Attys.

UNITED STATES PATENT OFFICE.

LEE H. PARKER, OF BOSTON, MASSACHUSETTS, ASSIGNOR TO SPRAY ENGINEERING COMPANY, OF BOSTON, MASSACHUSETTS, A CORPORATION OF MASSACHUSETTS.

SYSTEM AND APPARATUS FOR SPRAYING IN COOLING-PONDS AND THE LIKE.

1,233,119.  Specification of Letters Patent.  Patented July 10, 1917.

Application filed February 5, 1916. Serial No. 76,297.

*To all whom it may concern:*

Be it known that I, LEE H. PARKER, a citizen of the United States, and a resident of Boston, in the county of Suffolk and State of Massachusetts, have invented an Improvement in Systems and Apparatus for Spraying in Cooling-Ponds and the like, of which the following description, in connection with the accompanying drawings, is a specification, like characters on the drawings representing like parts.

This invention relates to systems of and apparatus for spraying liquid, preferably water, in cooling ponds and the like.

In order that the principle of the invention may be readily understood, I have disclosed certain embodiments thereof in the accompanying drawings, wherein—

The pollution of river water from waste products of manufacturing processes, thereby rendering it unfit for use in condensers, has led to the practice of constructing cooling ponds from which condensing water is drawn and to which the hot water from the condensers is returned, thus using the water repeatedly. The object of my invention is to provide a thoroughly efficient cooling system for various purposes, such, for example, as for use in steam engines and steam turbines, and for circulating water through the jackets of gas or other internal combustion engines. Other uses will, however, be apparent and are within the scope of my invention. While my system and method is not restricted to the use of any particular type of nozzle, I preferably employ the nozzle shown in the United States Patent to Eneas, No. 1,101,264, June 23, 1914, the said nozzle being one whereby a very thorough mixture of the jets of water is effected within the nozzle itself, so that the discharged spray may, particularly under high pressure, be very finely comminuted and issue as a wide spray of substantially homogeneous consistency throughout.

While therefore I am not limited to any particular nozzle that referred to peculiarly coöperates in accomplishing an effective cooling of the water as will hereinafter be more fully set forth.

Figure 1:
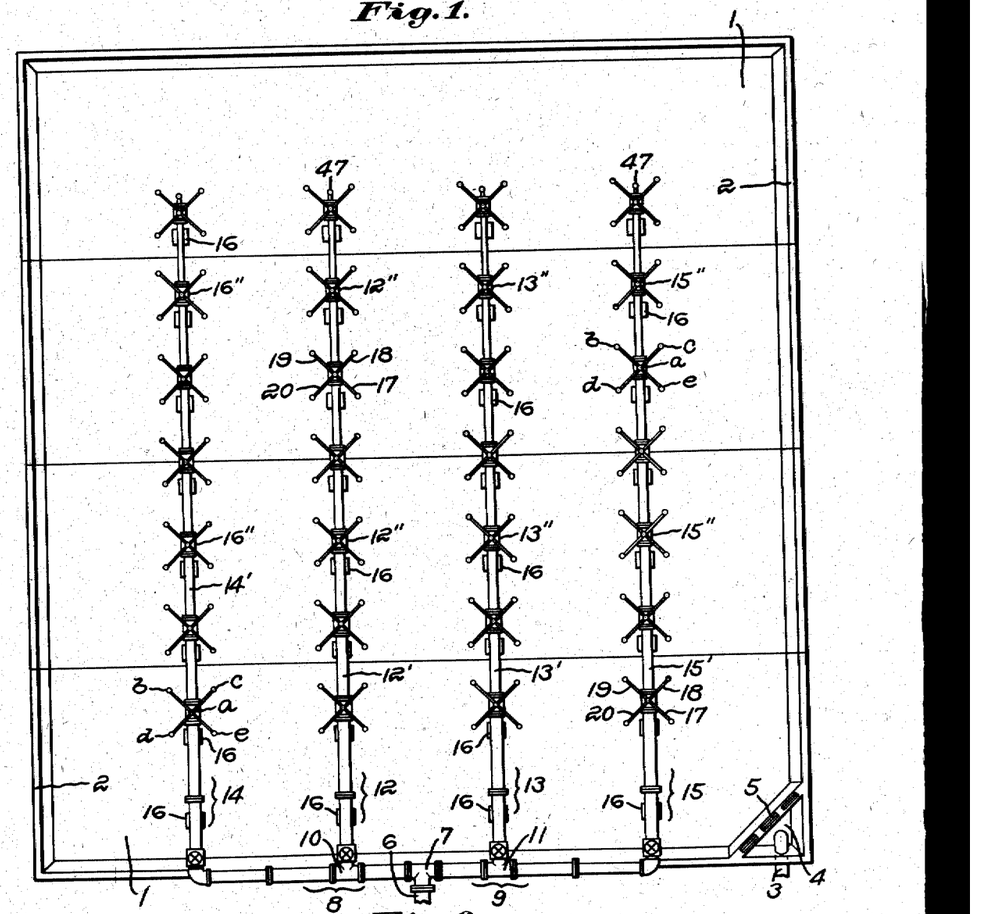
Figure 1 is a plan view of a cooling pond embodying one form of my invention.
Figure 2:
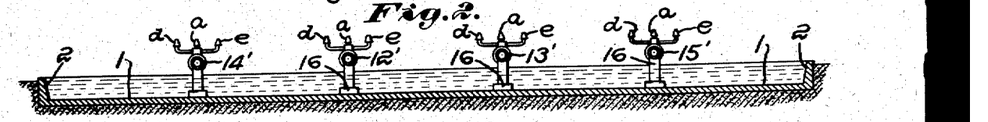
Fig. 2 is a transverse section thereof.
Figure 3:
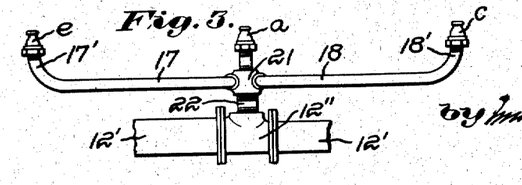
Fig. 3 is a side elevation of one group of nozzles.

Referring first to that form of my invention shown in Figs. 1, 2 and 3, I have therein represented a cooling pond 1, herein shown as of generally rectangular form and having surrounding walls 2 of any suitable material. I have represented an outlet pipe 3 at one corner of the pond and positioned within an inclosure 4 suitably screened, as indicated at 5, from the body of the pond.

The water from the condenser of the engine or any other usual source and which is in a quite highly heated condition, enters through the main pipe 6. In the present embodiment of the invention, the main communicates with a T 7 leading from which are the oppositely directed pipes 8, 9 having at suitable intervals T heads 10, 11. From said T heads lead pipes generally indicated at 12, 13, and in the present form of my invention pipes 14, 15 lead from the ends of the pipes 8, 9 in directions parallel with the pipes 12, 13. Within the scope of my invention, any suitable number of parallel or substantially parallel pipes may be employed, and they are placed sufficiently distant from each other as to permit a current of air to rise between the sets of sprays issuing from adjacent pipes.

Each of the pipes 12, 13, 14 and 15 is preferably supported in suitable manner above the bottom of the cooling pond and as, for example, upon concrete piers 16 positioned at suitable distances apart throughout the pond.

Each of the pipes 12, 13, 14, 15 is made up of a series of sections, and as these pipes are frequently of very considerable length, I have, after much experimentation, employed pipe sections of a uniform and standard length, such, for example, as twelve feet, these sections being indicated respectively at 12', 13', 14', 15. These sections of each pipe are united by suitable short sections, indicated at 12'', 13'', 14'', 15'', as most clearly shown in Figs. 1 and 3. Preferably, the successive sections in the pipes 12', 13', 14', 15' are of successively decreasing diameters, as most clearly indicated in Fig. 1, and in order suitably and readily to connect pipe sections of different diameters, I have constructed the short pipe sections 12'', 13'', 14'', 15'' as indicated in Fig. 3, wherein the short section 12'' is shown as having different diameters at its opposite ends, these diameters corresponding to the diameters of the two adjacent pipe sections 12'. The short sections 12'' I have termed eccentric T's or sections. A further important purpose of forming the same as illustrated is to insure the location of the bottom or lower side of all the pipe sections in essentially the same plane, thus avoiding all trapping of the water in the system. Preferably the whole system slopes or is pitched slightly downward toward the outer end of the pipe sections; that is, at the end where the drip sprays are located, but this sloping is very gradual and preferably slight. It is, however, important that the bottoms of all the pipe sections be in substantially the same plane and that there be no trapping of the water after the system has been shut down. Preferably, though not necessarily, each group of spray nozzles is supported by and is in communication with a short pipe section. Preferably also I provide five nozzles in each group, herein indicated at $a$, $b$, $c$, $d$ and $e$, the nozzle $a$ being a central nozzle and the other nozzles being supported by four preferably diagonally arranged pipes 17, 18, 19, 20. Viewing Fig. 1, it will be evident that by providing the diagonal arrangement of pipes 17, 18, 19, 20 and by positioning adjacent spray groups at a suitable distance apart, not only are the four nozzles $b$, $c$, $d$, $e$ of each group equidistant, but the nozzles $b$, $c$ of each group are substantially the same distance from the nozzles $d$, $e$ of the next adjacent group that they are from each other and from the nozzles $d$, $e$ of their own group. In this manner, I obtain the most effective distribution of the water issuing from the nozzles and provide for the most effective upward circulation of air between the nozzles, not only of a single group, but between the nozzles of adjacent groups.

Viewing Fig. 3, it will be evident that each of the pipes 17, 18, 19, 20 is upwardly bent at its outer end, as indicated at 17', 18', etc., and that the nozzles $a$, $b$, $c$, $d$ and $e$ are all vertically positioned; that is to say, the nozzles $a$, $b$, $c$, $d$ and $e$ are not inclined either inwardly toward each other, or outwardly from each other, both of such latter constructions being objectionable.

I have found after much experimentation that if the nozzles of a set be inclined toward each other, the drops or particles of water from adjacent jets will collide with or meet each other too close to the surface of the water and before the water discharged from the nozzles has come sufficiently into contact with the air to effect any substantial cooling thereof. If, on the other hand, the nozzles be outwardly inclined, then the upward circulation of air between the jets of adjacent pipe lines is interfered with, and moreover there is such a distribution of the water that the area of the pond must be increased to permit efficient cooling.

By positioning the nozzles vertically or substantially vertically as described, the particles of the spray issuing from the nozzles of a jet are caused to collide with the spray issuing from the adjacent jets of that set at a substantially greater distance above the surface of the pond. In this manner, I effect two important results. If the nozzles be inclined so that the drops or particles collide about two or three feet above the surface of the pond, a great deal of water in a well heated condition drops back into the pond. With the described vertical arrangement, not much water drops back immediately into the pond, but the water or a large percentage of the water is permitted to be discharged throughout what may be termed the normal field or extent of the inverted cone and to drop back from the inverted base in finely comminuted particles. If the impact or collision of the drops occurs at a very slight level above the surface of the pond, the drops are not sufficiently broken up, and much of the water is caused to drop directly back to the pond, instead of traveling out to what would be the base of the inverted cone. Moreover with the described vertical arrangement of the nozzles, there is secured a far better induced upward draft and circulation of the air, which is a matter of extreme importance. It is requisite to a proper and rapid cooling of the water that the water be brought into intimate contact with as great a volume of air as possible and that the latter be kept in constant circulation. Moreover, the intimate mixture of the circulating air with the water effects a purification of the whole.

I have set forth the objections to a system wherein the sprays from adjacent nozzles collide or impact at a relatively slight height above the surface of the cooling pond. In some respects an ideal system would be one wherein no spray from one nozzle collides with the spray from any other nozzle. Such an arrangement, however, would be in itself objectionable in that altogether too much area would be required for the proper number of spray nozzles. The difficulty on the one hand is that of impingement of the sprays at too slight an elevation above the surface of the pond, and on the other hand the distribution of the sprays at too great distances from each other, thus reducing the number of sprays that may be used upon a pond of given area. After a great deal of experimentation, I have ascertained that if two square feet of area of pond be afforded for one gallon per minute of sprayed water, the best arrangement is effected, considering all the problems involved.

By substantially the arrangement described, I effect not only an upward circulation of air between the sprays of adjacent groups, but also between the sprays of each group. If the supporting pipes or pipe arms of each group were too short, it is evident that the sprays of each group might so impinge upon each other as substantially to cut off all upward flow of water between them.

Figure 7:
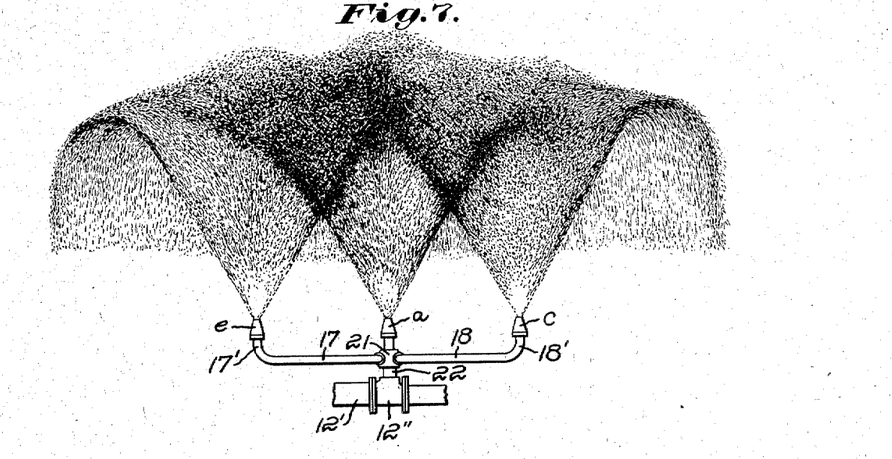
Fig. 7 is a somewhat diagrammatic illustration representing the discharge from a series of nozzles in the same group.

In Fig. 7, I have diagrammatically indicated the jets or sprays issuing from nozzles of the same set, the sprays from the several nozzles being somewhat diagrammatically indicated in said figure.

Figure 8:
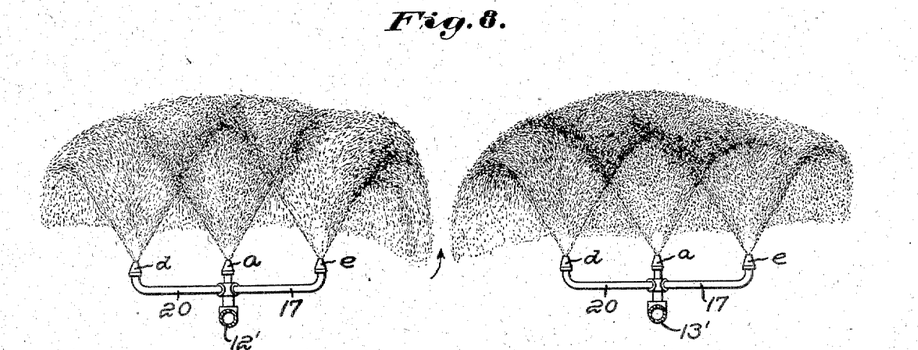
Fig. 8 is a diagrammatic illustration similar to Fig. 7, but representing sprays from adjacent pipe lines and the air circulation between them, the groups being somewhat closer together than usual in practice, to save space.

In Fig. 8, I have similarly represented sprays issuing from the nozzles of adjacent pipe lines, such, for example, as 12, 13, and have indicated the fact that sufficient distance is left between the descending portions of adjacent sprays to permit the effective upward passage of a column of cooling air.

The distance apart of adjacent parallel pipe lines, such, for example, as 12, 13, varies somewhat according to the pressure that it is desired to use, the greater the pressure employed, the greater being the distance between the adjacent pipe lines. In practice, I have found that by positioning adjacent pipe lines substantially twenty to twenty-five feet apart, I have provided for the proper upward movement of the air columns between the jets from adjacent pipe lines, and at the same time have compacted the pipe lines for the nozzles to as great an extent as is possible without interfering with the air circulation.

The length of the pipes 17, 18, 19, 20, of each set of nozzles may be varied within the scope of my invention, but for most purposes I have found that by making each of said pipes about five and a half feet in length with a length of pipe sections 12', 13', etc., about twelve feet, and a length of the short sections 12'', 13'' etc. of about one foot, I have secured substantially an equidistance of the outer nozzles of the group and the nozzles of adjacent groups connected with the same pipe line.

To obtain the most beneficial results and without unduly increasing the cost of the installation owing to additional nozzles and increased length of piping, the sprays issuing from nozzles in a single pipe line are preferably made to collide or impact upon each other at a sufficient distance above the surface of the pond to prevent the water falling back in a highly heated condition into the pond. It is important to obtain a maximum cooling effect with a minimum outlay for nozzles and piping. To this end the nozzles of each set are preferably arranged as shown in Figs. 1, 7 and 8. By arranging each set of nozzles in the same pipe line so that two nozzles therein are at substantially the same distance apart from each other that they are respectively from the nearest nozzles of the next adjacent set of nozzles in the same pipe line, I permit the impact of the sprays without interfering with the satisfactory cooling and at the same time provide for the most economic arrangement and number of nozzles and without adding to the length of the piping, which preferably is installed in uniform standard lengths. This arrangement is preferably continued for all the sets of each pipe line, considered by itself.

At the same time, the fifth or central nozzle of each set adds to the chimney effect of that set as elsewhere more fully referred to herein.

In certain cases, I put together two pipe sections 12, 12 and attach a short pipe section substantially a foot in length to the outer ends of these two pipe sections, thus spacing the centers of the two adjacent sets of nozzles substantially twenty-five feet apart. In such case, I have achieved the best results by making the pipe arms 17, 18, 19, 20 each substantially eight feet in length, thus again securing substantial equidistance between the several nozzles referred to.

The diagonally arranged pipes 17, 18, 19, 20 are preferably tapped at their inner ends into suitable openings in a head 21, which is supported upon the short pipe section 12", etc. by a short pipe 22.

Figures 4, 5:
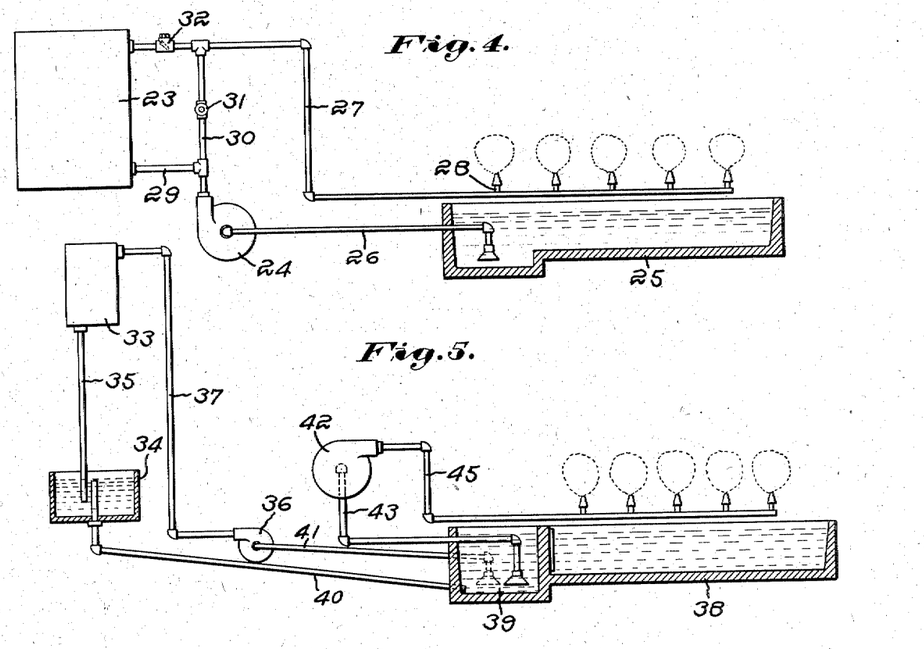
Fig. 4 is a partially diagrammatic view in side elevation and vertical section of a mixed discharge spraying system embodying my invention.
Fig. 5 is a similar view of a so-called multiple spraying system.

In Fig. 4, I have represented a further form of my invention and one whereby what I term a mixed discharge of the water is effected. In said figure, I have diagrammatically indicated the condenser at 23, the circulating pump at 24, it being one having an excess capacity, the cooling pond at 25, the pipe leading from the cooling pond to the pump at 26, and the pipe leading from the condenser to the cooling pond at 27, the latter pipe being provided with nozzles diagrammatically indicated at 28, but which preferably are arranged in sets as hereinbefore described. The pump 24 is connected with the condenser 23 by a pipe 29. Connecting the pipes 27, 29 is a by-pass 30 provided with a valve 31 and the pipe 27 is provided with a check valve 32. By opening the valve 31 a portion of the cooling water may be made to pass around the condenser and not through the same. The pump 24 has the necessary capacity to handle the total water sprayed. The pump may be of any suitable type, but preferably is a rotary pump. By suitably regulating the by-pass valve 31, any portion of the condenser cooling water may be sprayed, or in other words any desired portion of the water may be circulated through the by-pass instead of through the condenser. The system represented in Fig. 4, is what I term a mixed discharge system, in that the water sprayed may be partially that passing through the condenser and partially that merely circulated through the pond, the pump and the by-pass. By the system herein shown I may spray more water than passes through the condenser.

Figure 6:
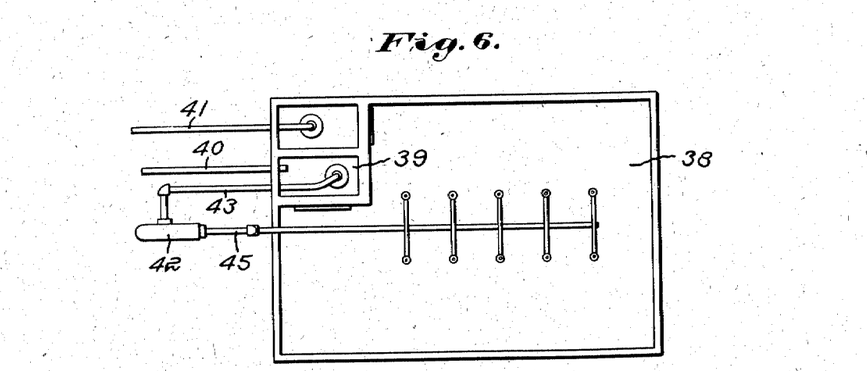
Fig. 6 is a plan view of the system represented in Fig. 5.

In Figs. 5 and 6, I have represented still another form of my invention. Therein, I have represented the condenser at 33 and a hot well at 34, it being in communication with the condenser through pipe 35. The circulating pump is indicated at 36, it being in communication with the condenser through a pipe 37. The cooling pond or suction well is indicated at 38, it being provided with an auxiliary hot well 39 that is in communication with the hot well 34 by means of a pipe 40. The circulating pump 36 is in communication with the auxiliary hot well 39, by means of pipe 41. The spray pump is indicated at 42, it being in communication with the auxiliary hot well by means of a pipe 43 and in communication with the nozzles diagrammatically indicated at 44 by means of pipe 45. The nozzles 44 are merely diagrammatically indicated and are preferably arranged in sets as heretofore described. Preferably the spray pump 42 is located at a higher level than the auxiliary hot well 39, so that such pump can draw water either from the pond 38 through piping not shown or from the hot well 39, or from both. The water flows by gravity from the hot well 34 to the auxiliary hot well 39, where it mixes with the water of the pond 38, thus lowering the temperature of the spray water, there being a suitable communication between the pond 38 and the supplemental hot well 39, that may if desired be screened.

Figure 9:
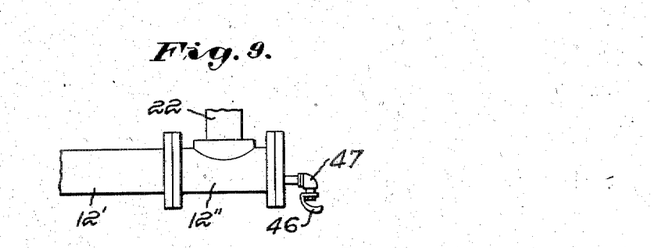
Fig. 9 is a detail in side elevation and particularly representing a drip spray nozzle.

In Fig. 9, I have indicated what I term a drip spray nozzle. I provide a spoonlike or other suitably shaped deflector or plate 46. I provide couplings 47 connected to the ends of the parallel pipe lines, such, for example, as the pipe lines 12, 13, etc., the drip water being discharged through said couplings 47 onto the parts 46 by which it is suitably scattered onto the surface of the water, and the bottom of the pond is protected from such drip. The purpose of the drip spray nozzle is to effect the discharge of the residual water from the pipe lines when the system is shut down and freezing would occur to the residual water left in the system. For this purpose, the said drip spray nozzles are connected to the ends of the ultimate pipe sections of the pipe lines and may be of any suitable character.

Figure 10:
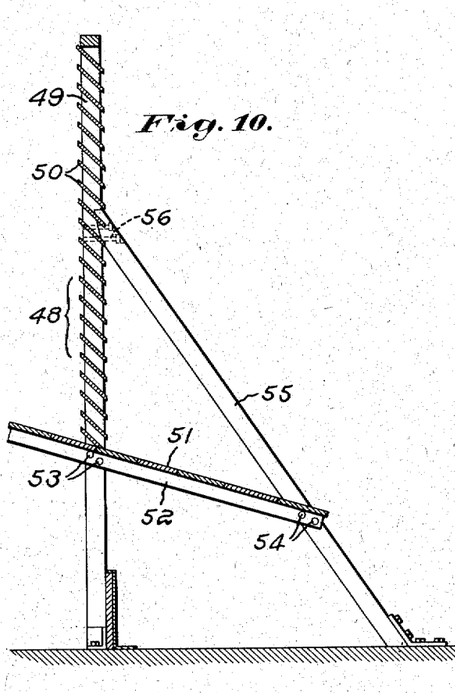
Fig. 10 is a view in vertical section of a fence surrounding a cooling pond, and certain means for admitting air to act upon the water issuing from the nozzles.

A spray system for cooling ponds is in accordance with my invention so arranged as to reduce the amount of drift to a minimum and to a negligible factor where possible. In certain cases, however, where the available space for the cooling pond is restricted and it is necessary to place one or more sides of the pond near buildings, as, for example, at a distance less than thirty feet from the buildings, I suitably provide means to protect the buildings from drift in case of high winds. Preferably also I provide means at the same time whereby the necessary air for cooling the water may be admitted. For this purpose, I have provided what is known as a louver fence, and I have herein indicated a section of the same at 48. Preferably such fence is composed of posts 49, between which are positioned slats 50 of suitable material arranged at a suitable distance apart and inclined substantially as indicated, so as to prevent the outward passage of spray or drift between the slats.

The spray deposited upon the slats drips back into the confines of the pond or onto the ground surrounding the pond within the louver fence. In order to provide for the admission of air for effecting the cooling of the sprayed water, I preferably provide the fence about the entire pond with a so-called apron 51 positioned at an inclination and spaced sufficiently from the ground to permit the in-rush of air for cooling purposes. I have herein represented the apron 51 as composed of suitably matched boards themselves secured to inclined beams 52 bolted to the posts 49 at 53 and also bolted at 54 to inclined braces 55 suitably secured at their lower ends and at their upper ends bolted to the posts 49 at 56. The apron 51 is suitably inclined so that the spray or drift falling thereon will drain back into the pond, but will not interfere with the in-rush of the cooling air.

Figure 11:
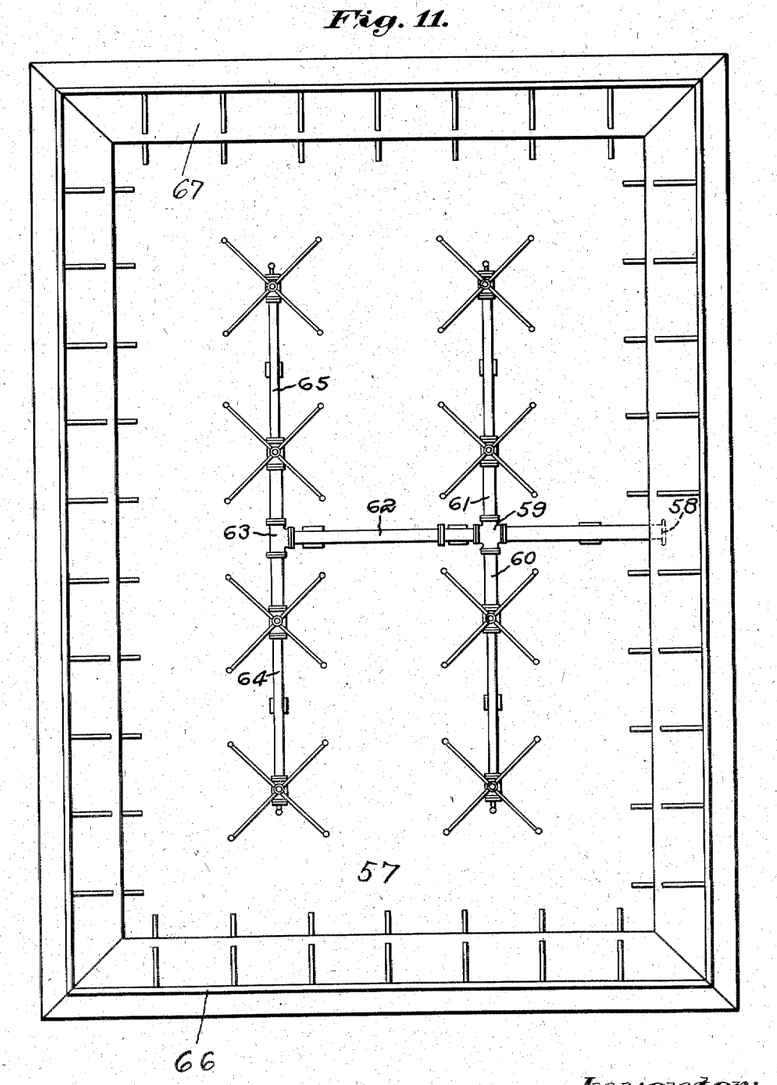
Fig. 11 is a plan view of a different arrangement of pipes and nozzles in a cooling pond embodying my invention.

In Fig. 11, I have represented a somewhat different form of my invention. Therein the cooling pond is represented at 57, the water being admitted through the main 58 from the condenser or other source. The pipe 58 is suitably supported upon piers as before described, and at its inner end is herein shown as having secured thereto a fitting 59 provided with four openings positioned ninety degrees apart. From these extend the pipes 60, 61, 62 preferably of the relative diameters indicated. The pipe 62 terminates in a T head 63, from which extend in opposite directions the pipes 64, 65. The said pipes 60, 61, 64, 65 are provided with sets of spray nozzles preferably similar to those shown in Figs. 1 and 2. Preferably the line pipes 60, 61, 64, 65 are provided at their ends with drip sprays, and all of said pipes are preferably mounted upon suitable piers, so as to be at suitable distance above the level of the water in the pond.

Preferably the several pipe lines are composed of pipe sections of a standard length, such as described in connection with Fig. 1, and each set of sprays is directly connected with a short pipe section interposed between the longer sections as described with respect to the same figures. In this form of my invention, the pond is preferably surrounded by a louver fence 66 having an apron 67 for the purpose already described.

Figure 12:
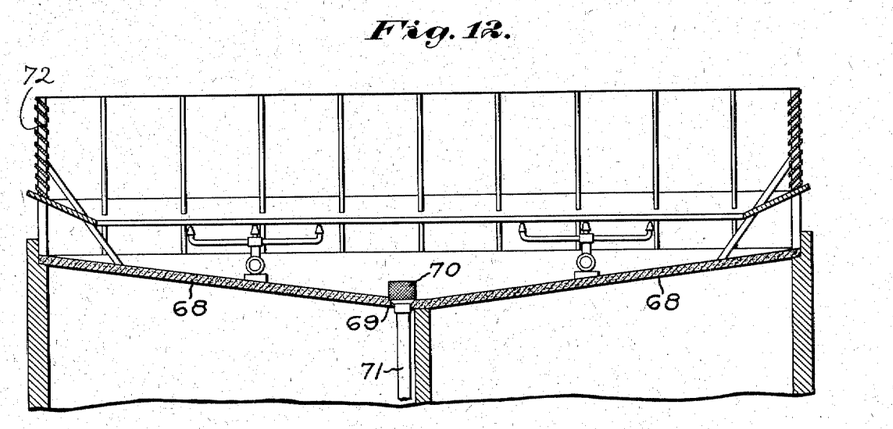
Fig. 12 is a vertical section of a cooling pond positioned on the roof of a building and certain connections therewith.

In Fig. 12, I have represented still another form of my invention. In cases where the space for ponds is very much restricted, they may be located upon the roof of the building. Such a pond, I have indicated in Fig. 12. In said figure, the roof of the building is indicated at 68, it being composed of suitable waterproof material. The roof preferably slopes to the center or some other portion thereof where it is provided with a suitable sump 69 suitably screened as indicated at 70 and connected with a downward spout 71 leading back to the condenser or other source of hot water. Preferably the pond is surrounded by a louver fence 72 similar to those already described, and the arrangement of piping and nozzles within the pond is preferably such as is shown in Fig. 1, or it may be some other suitable arrangement, such, for example, as that shown in Fig. 11.

Figure 13:
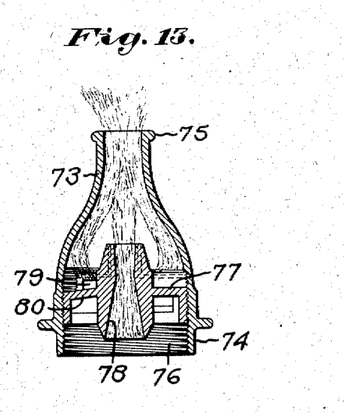
Fig. 13 is a vertical sectional view of a form of nozzle preferably employed by me in the practice of my invention.

In Fig. 13, I have represented in section the form of nozzle preferably employed by me. Therein I have indicated the shell or casing of the nozzle at 73, the entrance for the water at 74 and the discharge orifice at 75. Preferably the entrance 74 is suitably threaded as indicated at 76. Threaded or otherwise fitted or secured within the nozzle is the liquid guiding member 77 having a central, preferably straight, jet orifice 78, and one or more (preferably a series) of surrounding jet orifices 79, which may be secured by providing a series of vanes 80 more or less surrounding the central jet.

By the nozzle herein disclosed I effect a very thorough mixing of the water from the central and surrounding jets within the nozzle and hence the discharge of the water under suitable pressure in a wide spray of substantially homogeneous consistency and a thoroughly mixed condition. Particularly under high pressure, the water is very finely sub-divided and may be discharged almost in the form of a drifting vapor or so-called "smoke".

The sprays issuing from the jets in a single pipe line preferably collide or impact upon each other, but at a sufficient distance above the surface of the pond to prevent the water falling back in a highly heated condition into the pond.

The employment of a group of sprays secures what may be termed an accumulated air driving action, by means of which a strong current of cooling air is caused to rise between the sprays from adjacent pipe lines. In the practice of my invention, I effect, by the grouping of sprays into sets, an effective circulation of the cooling air, and the jets are so relatively positioned not only in each set, but in and with respect to adjacent sets that sufficient impact is secured between the sprays from adjacent sets of spray nozzles. At the same time, the system is rendered as compact as possible and the pressure is kept as low as possible consistent with the due circulation of cooling air.

In employing spraying systems such as shown in Fig. 1, Fig. 11, etc., it is to be understood that I employ a suitable pump or other suction or circulating device, by means of which the water is caused to circulate from the condenser or other source of hot water to the cooling pond and back to the condenser. I may in such connection employ the systems shown in Figs. 4, 5 and 6, or any of them, or may employ a circulating system not involving a mixed discharge or multiple spraying system.

It is by the correlation of the various factors set forth herein that I have been enabled to provide an effective cooling system and one which in practice has been found thoroughly efficient.

Having thus described certain illustrative embodiments of my invention, I desire it to

Claims:

1. A spraying system for cooling ponds and the like having a pipe line provided with spray nozzles arranged in sets, the outer nozzles of each set being substantially the same distance from each other as they are from the adjacent nozzles of the next adjacent sets.

2. A spraying system for spraying ponds and the like having a plurality of substantially parallel pipe lines, each provided with nozzles arranged in sets, the outer nozzles of each set being substantially the same distance from each other as they are from the next adjacent nozzles of adjacent sets, and said pipe lines being sufficiently spaced to permit an effective upward passage of cooling air between them.

3. A spraying system for cooling ponds and the like having a series of parallel substantially horizontally arranged pipe lines, each pipe line having vertical nozzles arranged in sets, each set supported by four pipes arranged diagonally of their pipe line, each diagonal pipe having a terminal vertical nozzle, whereby the sprays from each group of nozzles impinge upon each other at a sufficient distance above the level of the water to permit effective cooling of the sprays, prior to their dropping into contact with the water of the cooling pond.

4. A spraying system for cooling ponds and the like comprising a pipe line having a series of upwardly directed sets of spraying nozzles in communication therewith, each set consisting of four pipes radiating from a center in lines diagonal to the pipe line and having terminal upwardly directed nozzles.

5. A spraying system for cooling ponds and the like comprising a pipe line having a series of sets of pipes, upwardly directed, spraying nozzles in communication therewith, each set consisting of four pipes radiating from a center in lines diagonal to the pipe line and having upwardly directed terminal nozzles, each set having a central nozzle.

6. A spraying system for cooling ponds and the like comprising a pipe line having a plurality of upwardly directed sets of spraying nozzles, each set comprising four pipes radiating from a center in lines diagonal to a pipe line, the outer nozzles of each set being substantially equidistant from each other and from the adjacent nozzles of the adjacent set.

7. A spraying system for cooling ponds comprising a pipe line composed of pipe sections of substantially equal length with interposed, connecting, shorter, pipe sections and upwardly directed nozzles arranged in sets and respectively connected with said shorter pipe sections, each set consisting of a plurality of pipes diagonally arranged with respect to said pipe line and having upwardly directed terminal nozzles, whereby the sprays from each group of nozzles impinge upon each other at a sufficient distance above the level of the water to permit effective cooling of the sprays prior to their dropping into contact with the water of the cooling pond.

8. A spraying system comprising a plurality of pipe lines, each composed of a plurality of pipe sections and short couplings connecting said sections, an upright pipe leading from each of said couplings, each of said upright pipes having a set of vertically positioned nozzles, the nozzles of each set and of adjacent sets of the same pipe line being so positioned that the sprays therefrom collide at a relatively great height above the level of the pond, and the adjacent pipe lines being sufficiently spaced to provide for an effective upward circulation of cooling air between said pipe lines.

9. A spraying system comprising a pipe line composed of sections of progressively decreasing diameter, and a series of sets of spraying nozzles supported by and in connection with said pipe lines, the outer nozzles of each set being substantially the same distance from each other that they are from the adjacent nozzles of adjacent sets.

10. A spraying system having a pipe line provided with upstanding spraying nozzles, said pipe line having at the otherwise closed end of the pipe line a drip spray nozzle, thereby preventing collection of water at the end of the pipe line.

11. A spraying system comprising a pipe line composed of relatively long sections of progressively decreasing diameters, and short connecting sections therebetween, said short sections being of different diameters at their two ends but having their lower sides in the plane of the lower sides of the longer sections and spray nozzles upwardly extending from and in communication with said short connecting sections.

12. A spraying system including a pipe line composed of two relatively long sections of different diameters, and an intervening, connecting, short section having its ends of diameters corresponding to those of the other sections, the bottoms of all the sections being in the same plane and spray nozzles upwardly extending from and in communication with said short connecting sections.

13. A spraying system for cooling ponds and the like comprising a pipe line provided with spray nozzles arranged in sets, said pipe line sloping downwardly toward its outer end, the outer nozzle of each set being substantially the same distance from each other that they are from the adjacent nozzles of the adjacent sets.

14. A spraying system for cooling ponds and the like having a plurality of pipe lines, each provided with spraying nozzles arranged in a plurality of sets, the nozzles of each set, the sets of each pipe line and the sets of adjacent pipe lines being arranged to secure an upward circulation of air between the jets of each set, a greater upward circulation of air between adjacent sets of the same pipe line, and a still greater upward circulation of air between the sets of adjacent pipe lines.

15. A spraying system for cooling ponds and the like having a pipe line composed of a series of sections of successively decreasing diameter, and connecting shorter sections therebetween, each of said shorter sections having parts of two diameters for connection with the respective sections, a plurality of pipes diagonally arranged with respect to said pipe lines and arranged in sets in respective communication with each of said shorter sections, and an upwardly directed spray nozzle at the outer end of each diagonally arranged pipe.

16. A spraying system for cooling ponds and the like having a pipe line composed of sections of decreasing diameter, the bottom of all of said sections being substantially in the same plane to avoid trapping, and spray nozzles in communication with the respective sections and upwardly directed therefrom to discharge spray upwardly for return in markedly cooler condition to said pond.

17. A spraying system for cooling ponds and the like having a plurality of pipe lines arranged in substantial parallelism, each of said pipe lines having a plurality of sets of nozzles and each of said pipe lines being composed of a set of imperforate pipe lengths and interposed short couplings, from which couplings only the nozzles extend, the nozzles of each set being substantially the same distance from each other that they are from the nearest nozzles of the next adjacent set of the same pipe line, and the nearest nozzles of corresponding sets in adjacent pipe lines being at a greater distance apart than are said nozzles of each set, thereby to effect and permit a spray induced, upward air current between the sets of nozzles of adjacent pipe lines.

18. A spraying system for spraying ponds and the like having a pipe line provided with a plurality of sets of spray nozzles, each set being symmetrically arranged in groups of five, four of said jets being at the corners of a rectangle and the fifth jet being at the center thereof, thereby to produce a substantially uniform column of spray issuing therefrom.

19. A spraying system for spraying ponds and the like having a pipe line provided with a plurality of sets of spray nozzles, each set being symmetrically arranged in groups of five, four of said jets being at the corners of a rectangle and the fifth jet being at the center thereof, thereby to produce a substantially uniform column of spray issuing therefrom, said five nozzles being sufficiently spaced to effect an induced, upward current of air between the nozzles thereof.

20. A spraying system for spraying ponds and the like having a pipe line provided with a plurality of sets of spray nozzles, each set being symmetrically arranged in groups of five, four of said jets being at the corners of a rectangle and the fifth jet being at the center thereof, thereby to produce a substantially uniform column of spray issuing therefrom, said five nozzles being sufficiently spaced to effect an induced, upward current of air between the nozzles thereof, and the nozzles of adjacent sets being spaced to permit in effect a greater upward, induced current of air between the nozzles of said adjacent sets.

21. A spraying system for cooling ponds and the like having a pipe line composed of sections with interposed, connected couplings at intervals, and a plurality of nozzles leading upwardly from each coupling to constitute a set, the nozzles of each set being directed upward, thereby to effect an intermingling of the jets from the nozzles of each set markedly above the surface of the pond and at sufficient distance thereabove to permit the marked and effective cooling of the liquid while in the air above the pond the nozzles of each set being substantially the same distance from each other that they are from the nearest nozzles of the next adjacent set of pipe line.

22. A spraying system for cooling ponds and the like having a pipe line composed of sections with interposed, connected couplings at intervals, and a plurality of nozzles leading upwardly from each coupling to constitute a set, the nozzles of each set being connected to the respective couplings by pipes arranged diagonally of said pipe line and of substantially equal length, thereby positioning the nozzles of each set substantially equidistant.

23. A spraying system for cooling ponds and the like having a plurality of pipe lines, each provided with spraying nozzles arranged in a plurality of sets, thereby at each set to produce a chimney effect upon the air through the concentrated heating action of a plurality of adjacent jets of heated water, said sets being spaced transversely and longitudinally of the cooling pond to permit the natural movement of air currents therebetween and the access of said air currents to the nozzles of each set, the spacing of adjacent sets on the same pipe line being substantially the same as the spacing of nozzles in each set, and the spacing between corresponding sets in adjacent pipe lines being greater than the spacing of nozzles in the same set.

24. A spraying system for cooling ponds and the like having a plurality of pipe lines, each provided with spraying nozzles arranged in a plurality of sets, thereby at each set to produce a chimney effect upon the air through the concentrated heating action of a plurality of adjacent jets of heated water, said sets being spaced transversely and longitudinally of the cooling pond to permit the natural movement of air currents therebetween and the access of said air currents to the nozzles of each set, the nozzles of said sets being upwardly directed to effect an upward discharge of the liquid with an intermingling of the spray from adjacent nozzles of each set at points markedly above the level of the water and at an elevation sufficient to permit marked cooling of the spray prior to its dropping into contact with the water of the cooling pond, the spacing of adjacent sets on the same pipe line being substantially the same as the spacing of nozzles in each set, and the spacing between corresponding sets in adjacent pipe lines being greater than the spacing of nozzles in the same set.

25. A spraying system for cooling ponds and the like having a plurality of pipe lines, each provided with spraying nozzles arranged in a plurality of sets, thereby at each set to produce a chimney effect upon the air through the concentrated heating action of a plurality of adjacent jets of heated water, said jets being spaced to afford access to each of them throughout the area of the cooling pond by lanes permitting the natural movement of air currents, the nozzles of each set being vertically upwardly directed to secure an intermingling of the spray from adjacent nozzles of a set at points markedly above the level of the water and at an elevation sufficient to permit marked cooling of the spray prior to its dropping into contact with the water of the cooling pond and a plurality of pipes arranged substantially diagonally to each pipe line and supporting respectively the nozzles of each set.

26. A spraying system for cooling ponds and the like having a pipe line composed of sections of uniform length and interposed, short, coupling sections, pipes leading upward from each of said coupling sections, and a series of upwardly directed nozzles mounted upon and in communication with each of said pipes.

27. A spraying system for cooling ponds and the like having a pipe line composed of series of sections, each of uniform diameter throughout but of successively decreasing diameter as a series, short coupling sections interposed between and connecting said longer sections, and a series of upwardly directed nozzles leading from and in communication with each of said coupling sections, the nozzles of each set being positioned in proximity to produce a chimney effect upon the air by the heating action of liquid discharged from such set of nozzles.

28. A spraying system for cooling ponds and the like having a pipe line composed of series of sections, each of uniform diameter throughout but of successively decreasing diameter as a series, short coupling sections interposed between and connecting said longer sections, all of said sections being positioned with their lower sides in substantially the same horizontal plane to prevent trapping of the liquid.

29. A spraying system for cooling ponds and the like having one or more pipe lines, each line being made up of a series of imperforate pipe lengths, short couplings between and connecting said lengths, an upright pipe leading from each of said couplings, and a cluster or group of nozzles connected with and upwardly directed from each of said upright pipes, the nozzles of each set being supported by pipes arranged substantially diagonally with respect to the pipe line thereof and having upwardly turned outer ends upon which the respective nozzles are vertically positioned, the nozzles of each cluster or group thereby effecting an upward discharge of liquid with an intermingling of spray from adjacent nozzles of each cluster or group at points markedly above the level of the water and at an elevation sufficient to permit marked cooling of the spray prior to its dropping into contact with the water of the cooling pond.

30. A spraying system for cooling ponds and the like having a plurality of pipe lines, each pipe line being made up of a plurality of imperforate pipe lengths, short couplings between and connecting adjacent pipe lengths of each line, an upright pipe leading from each coupling, and a cluster or group of nozzles connected with and upwardly directed from each of said upright pipes, the nozzles of each cluster or group being in sufficient proximity to create a chimney effect, and the clusters or groups of adjacent pipe lines being farther apart than those of any one pipe line, thereby creating lanes through which the air may have thorough access to the water sprayed from said nozzles.

31. A spraying system for cooling ponds and the like having a plurality of pipe lines, each pipe line being made up of a plurality of imperforate pipe lengths, the pipe lengths of each line being of successively decreasing diameter, short couplings between and connecting adjacent pipe lengths of each pipe line, an upright pipe leading from each of said couplings, a cluster or group of nozzles connected with and upwardly directed from each of said upright pipes, the upward position of said nozzles effecting an intermingling of the spray from nozzles of each group markedly above the level of the water and at an elevation sufficient to permit marked cooling of the spray prior to its dropping into contact with the water of the cooling pond.

32. A spraying system for cooling ponds and the like having a plurality of pipe lines, each pipe line being made up of imperforate pipe sections of equal length, short pipe couplings between and connecting adjacent pipe lengths, a pipe upwardly leading from each of said couplings, four substantially horizontal pipes arranged diagonally of said pipe lines and leading from said upright pipes, and an upright nozzle in communication with the outer end of each of said diagonally arranged pipes, the nozzles of each group being in sufficient proximity to create a chimney effect, and the group of nozzles of adjacent pipe lines being spaced farther apart than those of the same pipe line, thereby to create lanes through the pond for the circulation of air.

33. A spraying system for cooling ponds comprising a plurality of pipe lines, each composed of relatively long imperforate pipe sections of equal, standard length, short couplings connecting adjacent pipe sections of the same pipe line, upright pipes extending from each of said couplings only, whereby tapping of the pipe sections is avoided, and a group of nozzles vertically upwardly directed from and in communication with each of said upwardly extending pipes, the nozzles of each group being in sufficient proximity whereby the sprays from each group of nozzles impinge upon each other at a substantial distance above the level of the water 34. A spraying system for cooling ponds and the like having a pipe line composed of a series of imperforate sections of successively decreasing diameter, short couplings between and connecting adjacent sections, each of said couplings having parts of two diameters for connection with the adjacent sections, a pipe upwardly leading from each of said couplings and upwardly directed nozzles in communication with each of said upwardly directed pipes.

35. A spraying system for cooling ponds and the like having a pipe line provided with a plurality of sets of spray nozzles, each nozzle being directed vertically upward, each set of nozzles being symmetrically arranged in groups of five, four of said jets being at the corners of the rectangle and the fifth jet being at the center thereof, thereby to produce a substantially uniform column of spray issuing therefrom.

In testimony whereof, I have signed my name to this specification.

LEE H. PARKER.

It is hereby certified that in Letters Patent No. 1,233,119, granted July 10, 1917, upon the application of Lee H. Parker, of Boston, Massachusetts, for an improvement in "Systems and Apparatus for Spraying in Cooling-Ponds and the Like," errors appear in the printed specification requiring correction as follows: Page 6, lines 39 and 56, claims 4 and 6, strike out the words "upwardly directed"; same page, lines, and claims, after the word "of" second occurrence, insert the words *upwardly directed;* and that the said Letters Patent should be read with these corrections therein that the same may conform to the record of the case in the Patent Office.

Signed and sealed this 18th day of September, A. D., 1917.

[SEAL.]

R. F. WHITEHEAD,

*Acting Commissioner of Patents.*

Cl. 137—66.